(12) United States Patent
Maeda

(10) Patent No.: US 11,076,140 B2
(45) Date of Patent: Jul. 27, 2021

(54) INFORMATION PROCESSING APPARATUS AND METHOD OF CONTROLLING THE SAME

(71) Applicant: CANON KABUSHIKI KAISHA, Tokyo (JP)

(72) Inventor: Mitsuru Maeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 254 days.

(21) Appl. No.: 16/262,251

(22) Filed: Jan. 30, 2019

(65) Prior Publication Data
US 2019/0246089 A1 Aug. 8, 2019

(30) Foreign Application Priority Data
Feb. 5, 2018 (JP) .............................. JP2018-018517

(51) Int. Cl.
*G06K 9/00* (2006.01)
*H04N 13/111* (2018.01)
*G06T 7/55* (2017.01)
*H04N 13/189* (2018.01)
*H04N 5/247* (2006.01)
*H04N 5/232* (2006.01)
*G06T 15/20* (2011.01)

(52) U.S. Cl.
CPC ............. *H04N 13/111* (2018.05); *G06T 7/55* (2017.01); *G06T 15/205* (2013.01); *H04N 5/232* (2013.01); *H04N 5/247* (2013.01); *H04N 13/189* (2018.05)

(58) Field of Classification Search
CPC ...... H04N 13/111; H04N 5/247; H04N 5/232; H04N 13/189; G06T 15/205; G06T 7/55

USPC ........................................... 382/154
See application file for complete search history.

(56) References Cited

U.S. PATENT DOCUMENTS

| 6,525,731 B1* | 2/2003 | Suits ...................... G06T 15/04 345/421 |
| 2007/0122027 A1* | 5/2007 | Kunita .................... G06T 7/593 382/154 |
| 2009/0128549 A1* | 5/2009 | Gloudemans ........... G06T 15/20 345/419 |
| 2011/0254958 A1* | 10/2011 | Kotani .................. G06T 15/205 348/159 |

(Continued)

FOREIGN PATENT DOCUMENTS

JP 2010020487 A 1/2010

*Primary Examiner* — Van D Huynh
(74) *Attorney, Agent, or Firm* — Carter, DeLuca & Farrell LLP

(57) ABSTRACT

An information processing apparatus that performs processing to generate a virtual viewpoint image based on a plurality of captured images obtained by a plurality of cameras, comprises an obtaining unit that obtains visibility information which is related to components of a three-dimensional shape model of an object, wherein the visibility information is configured to be used for identifying whether pixels corresponding to the components are included in a captured image for each of not less than two captured images of the plurality of captured images, a selection unit that selects, based on the visibility information, from material data which is based on the captured image obtained by a camera included in the plurality of cameras and is stored in a predetermined storage unit, data to be used to generate the virtual viewpoint image.

15 Claims, 12 Drawing Sheets

(56) References Cited

U.S. PATENT DOCUMENTS

| | | | |
|---|---|---|---|
| 2012/0314932 A1* | 12/2012 | Nakayama | G06T 7/77 |
| | | | 382/154 |
| 2019/0132529 A1* | 5/2019 | Ito | H04N 13/189 |
| 2019/0228230 A1* | 7/2019 | Onuma | H04N 21/23418 |
| 2020/0128232 A1* | 4/2020 | Hwang | H04N 5/23293 |

* cited by examiner

FIG. 9

|  | 81a | 81b | 81c | 81d | 81e | 81f | 81g | 81h | SUBTOTAL |
|---|---|---|---|---|---|---|---|---|---|
| 801 | 1 |  |  |  |  |  |  |  | 1 |
| 802 | 1 | 1 | 1 |  |  |  |  | 1 | 3 |
| 803 |  | 1 | 1 | 1 |  |  |  |  | 3 |
| 804 |  |  | 1 | 1 | 1 |  |  |  | 3 |
| 805 |  |  | 1 | 1 | 1 |  |  |  | 3 |
| 806 |  |  | 1 | 1 | 1 | 1 | 1 |  | 5 |
| 807 |  |  |  |  | 1 | 1 | 1 |  | 3 |
| 808 |  |  |  |  |  | 1 | 1 |  | 2 |
| 809 |  |  |  |  |  |  | 1 | 1 | 2 |
| 810 | 1 | 1 |  |  |  |  | 1 | 1 | 2 |
| SUBTOTAL | 3 | 3 | 5 | 4 | 4 | 3 | 5 | 3 |  |

FIG. 10

|  | 81a | 81c | 81g |
|---|---|---|---|
| 801 | 1 |  |  |
| 802 | 1 | 1 |  |
| 803 |  | 1 |  |
| 804 |  | 1 |  |
| 805 |  | 1 |  |
| 806 |  | 1 | 1 |
| 807 |  |  | 1 |
| 808 |  |  | 1 |
| 809 |  |  | 1 |
| 810 | 1 |  | 1 |
| SUBTOTAL | 3 | 5 | 5 |

FIG. 11

|  | 81a | 81b | 81c | 81d | 81e | 81f | 81g | 81h | SUBTOTAL |
|---|---|---|---|---|---|---|---|---|---|
| 801 | 1 |  |  |  |  |  |  |  | 1 |
| 802 | 1 | 1 | 1 |  |  |  |  | 1 | 3 |
| 803 |  | 1 | 1 | 1 |  |  |  |  | 3 |
| 804 |  |  | 1 | 1 | 1 |  |  |  | 3 |
| 805 |  |  |  | 1 | 1 | 1 |  |  | 3 |
| 806 |  |  |  | 1 | 1 | 1 | 1 | 1 | 5 |
| 807 |  |  |  |  | 1 | 1 | 1 |  | 3 |
| 808 |  |  |  |  |  |  | 1 | 1 | 2 |
| 809 |  |  |  |  |  |  | 1 | 1 | 2 |
| 810 | 1 | 1 |  |  |  |  | 1 | 1 | 2 |
| SUBTOTAL | 2 | 1 |  | 0 | 1 | 2 | 4 | 2 |  |

FIG. 12

|  | 81a | 81b | 81c | 81d | 81e | 81f | 81g | 81h | SUBTOTAL |
|---|---|---|---|---|---|---|---|---|---|
| 801 | 1 |  |  |  |  |  |  |  | 1 |
| 802 | 1 | 1 | 1 |  |  |  |  | 1 | 3 |
| 803 |  | 1 | 1 | 1 |  |  |  |  | 3 |
| 804 |  |  | 1 | 1 | 1 |  |  |  | 3 |
| 805 |  |  |  | 1 | 1 | 1 |  |  | 3 |
| 806 |  |  |  | 1 | 1 | 1 | 1 | 1 | 5 |
| 807 |  |  |  |  | 1 | 1 | 1 |  | 3 |
| 808 |  |  |  |  |  |  | 1 | 1 | 2 |
| 809 |  |  |  |  |  |  | 1 | 1 | 2 |
| 810 | 1 | 1 |  |  |  |  | 1 | 1 | 2 |
| SUBTOTAL | 1 | 0 |  | 0 | 0 | 0 |  | 0 |  |

FIG. 13A

| | PRIORITY VALUE |
|---|---|
| 801 | 0 |
| 802 | 127 |
| 803 | 127 |
| 804 | 127 |
| 805 | 127 |
| 806 | 127 |
| 807 | 0 |
| 808 | 0 |
| 809 | 0 |
| 810 | 0 |

FIG. 13B

| | PRIORITY VALUE |
|---|---|
| 801 | 0 |
| 802 | 127 |
| 803 | 127 |
| 804 | 127 |
| 805 | 127 |
| 806 | 127 |
| 807 | 126 |
| 808 | 126 |
| 809 | 126 |
| 810 | 126 |

FIG. 13C

| | PRIORITY VALUE |
|---|---|
| 801 | 125 |
| 802 | 127 |
| 803 | 127 |
| 804 | 127 |
| 805 | 127 |
| 806 | 127 |
| 807 | 126 |
| 808 | 126 |
| 809 | 126 |
| 810 | 126 |

|     | 81a | 81b | 81c | 81d | 81e | 81f | 81g | 81h |
|-----|-----|-----|-----|-----|-----|-----|-----|-----|
| 801 | 125 |     |     |     |     |     |     |     |
| 802 | 127 | 127 | 127 |     |     |     |     | 127 |
| 803 |     | 127 | 127 | 127 |     |     |     |     |
| 804 |     |     | 127 | 127 | 127 |     |     |     |
| 805 |     |     | 127 | 127 | 127 |     |     |     |
| 806 |     |     | 127 | 127 | 127 | 127 | 127 |     |
| 807 |     |     |     |     | 126 | 126 | 126 |     |
| 808 |     |     |     |     |     | 126 | 126 |     |
| 809 |     |     |     |     |     |     | 126 | 126 |
| 810 | 126 | 126 |     |     |     |     | 126 | 126 |

| CAMERA | 81a | 81b | 81c | 81d | 81e | 81f | 81g | 81h |
|--------|-----|-----|-----|-----|-----|-----|-----|-----|
| PRIORITY VALUE | 6 | 8 | 5 | 5 | 5 | 5 | 7 | 5 |

INFORMATION PROCESSING APPARATUS AND METHOD OF CONTROLLING THE SAME

BACKGROUND OF THE INVENTION

Field of the Invention

The present invention relates to a technique of generating a virtual viewpoint image by using a plurality of images that are obtained from a plurality of cameras for capturing an object from a plurality of directions.

Description of the Related Art

A technique of generating a virtual viewpoint image by setting a plurality of cameras in different positions, performing synchronized image capturing from multiple viewpoints, and using a plurality of plurality of viewpoint images obtained by the image capturing operations is gaining attention. According to such a technique of generating a virtual viewpoint image, because the highlight scenes of, for example, a soccer game or a basketball game can be viewed from various angles, a user can have a more true-to-life viewing experience than watching a normal image. A virtual viewpoint image is generated by generating a target three-dimensional model from images obtained by capturing a target scene from a plurality of viewpoints (cameras), and coloring the generated three-dimensional model based on the captured images.

As a technique of generating such a virtual viewpoint image, Japanese Patent Laid-Open No. 2010-020487 (to be referred to as patent literature 1 hereinafter) discloses a method of adding a priority order to each texture image in accordance with the ascending order of the angle formed in the line-of-sight direction of the virtual viewpoint and selecting a plurality of texture images to be mixed in accordance with the priority order.

In the technique disclosed in patent literature 1, an image from the camera is selected, according to the requirements, after the position and the direction of a virtual viewpoint have been determined. Hence, a complicated computation needs to be performed in order to select the plurality of texture images after the position and the direction of the virtual viewpoint have been determined, and there is a possibility that many delays would undesirably occur until a virtual viewpoint image is generated.

SUMMARY OF THE INVENTION

According to one aspect of the present invention, there is provided an information processing apparatus that performs processing to generate a virtual viewpoint image based on a plurality of captured images obtained by performing image capturing from a plurality of directions by a plurality of cameras, comprising: an obtaining unit configured to obtain visibility information which is related to components of a three-dimensional shape model of an object to be captured by at least one of the plurality of cameras, wherein the visibility information is configured to be used for identifying whether pixels corresponding to the components are included in a captured image for each of not less than two captured images of the plurality of captured images; and a selection unit configured to select, based on the visibility information obtained by the obtaining unit, from material data which is based on the captured image obtained by a camera included in the plurality of cameras and is stored in a predetermined storage unit, data to be used to generate the virtual viewpoint image.

According to another aspect of the present invention, there is provided a method of controlling an information processing apparatus that performs processing to generate a virtual viewpoint image based on a plurality of captured images obtained by performing image capturing from a plurality of directions by a plurality of cameras, the method comprising: obtaining visibility information which is related to components of a three-dimensional shape model of an object to be captured by at least one of the plurality of cameras, wherein the visibility information is configured to be used for identifying whether pixels corresponding to the components are included in a captured image for each of not less than two captured images of the plurality of captured images; and selecting, based on the obtained visibility information, from material data which is based on the captured image obtained by a camera included in the plurality of cameras and is stored in a predetermined storage unit, data to be used to generate the virtual viewpoint image.

According to another aspect of the present invention, there is provided a non-transitory computer-readable storage medium that stores a program configured to cause a computer to execute a method of controlling an information processing apparatus that performs processing to generate a virtual viewpoint image based on a plurality of captured images obtained by performing image capturing from a plurality of directions by a plurality of cameras, the method comprising: obtaining visibility information which is related to components of a three-dimensional shape model of an object to be captured by at least one of the plurality of cameras, wherein the visibility information is configured to be used for identifying identify whether pixels corresponding to the components are included in a captured image for each of not less than two captured images of the plurality of captured images; and selecting, based on the obtained visibility information, from material data which is based on the captured image obtained by a camera included in the plurality of cameras and is stored in a predetermined storage unit, data to be used to generate the virtual viewpoint image.

Further features of the present invention will become apparent from the following description of exemplary embodiments (with reference to the attached drawings).

BRIEF DESCRIPTION OF THE DRAWINGS

FIG. 9 is a table expressing an example of visibility data;

FIG. 10 is a table expressing an example of the visibility data;

FIG. 11 is a table expressing an example of visibility determination processing;

FIG. 12 is a table expressing an example of the visibility determination processing;

FIGS. 13A to 13C are tables expressing an example of priority values;

DESCRIPTION OF THE EMBODIMENTS

Figure 1:
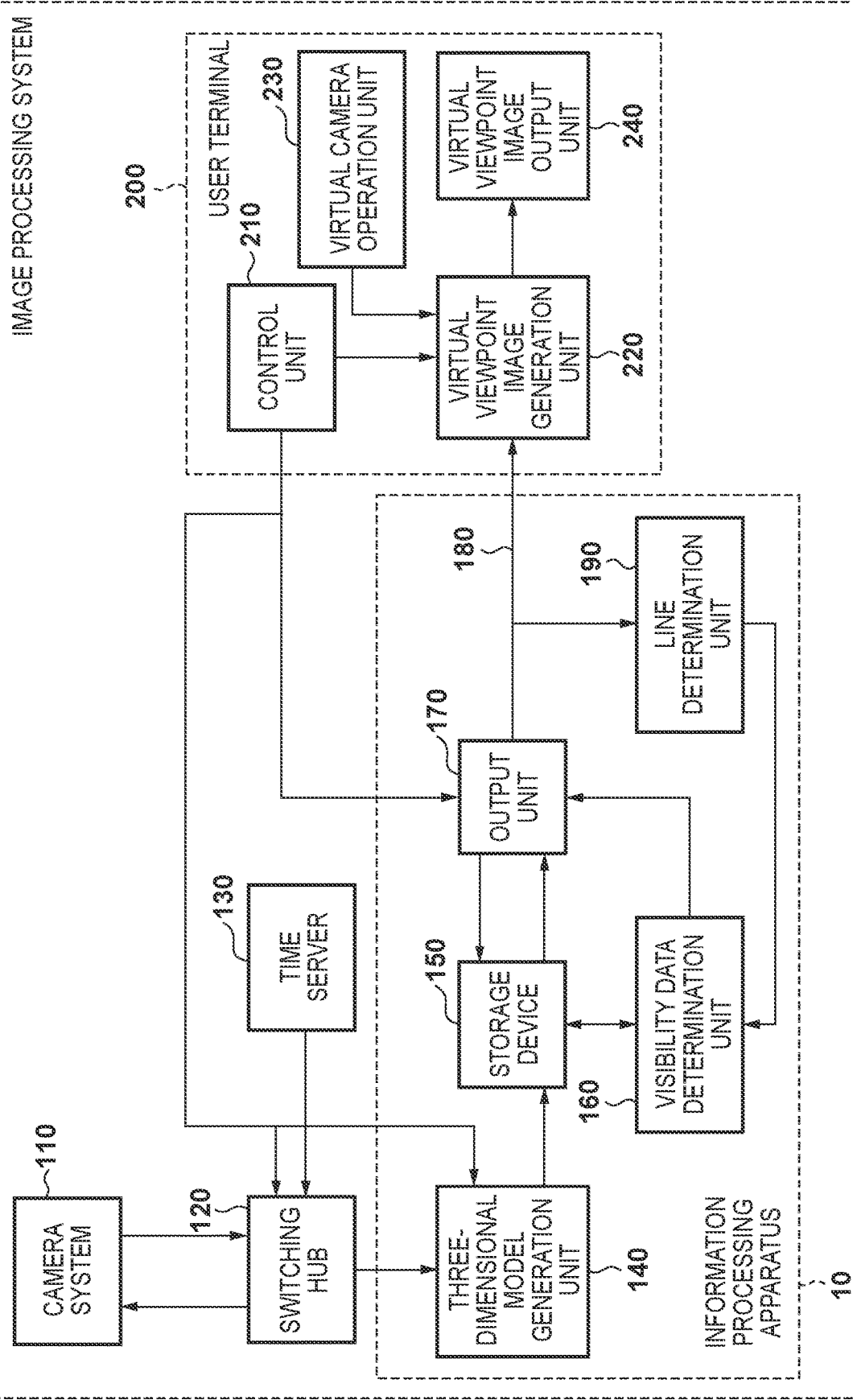
FIG. 1 is a block diagram showing an example of the functional arrangement of an image processing system 100 according to the first embodiment.

Embodiments of the present invention will be described hereinafter with reference to the accompanying drawings. Note that arrangements shown in the following embodiments are merely examples, and the present invention is not limited to the arrangement shown in the drawings.

The following embodiments will describe an image processing system that generates a virtual viewpoint image. The generation of a virtual viewpoint image requires the use of material data (three-dimensional model, foreground images, and the like) based on a plurality of captured images that are obtained by performing image capturing from a plurality of directions by a plurality of cameras. Hence, the data transfer for generating a virtual viewpoint image requires a large bandwidth. In a case in which the bandwidth of the transfer path for data transfer is narrow, all of the images cannot be transferred and, for example, each foreground image which includes the texture for coloring a three-dimensional model will not be transmitted. Also, in a case in which all of the data cannot be transmitted for virtual viewpoint image generation processing due to the narrow transfer path bandwidth, the transfer may be performed by thinning out the cameras to be used. However, in such a case, since the cameras will be thinned out regardless of the status of an object, a state in which a part of the three-dimensional model cannot be colored due to the thinning out of the information required for the generation of a virtual viewpoint image may occur, and the image quality may greatly degrade. The embodiments for solving at least some of these problems will be described.

First Embodiment

An image processing system for performing image capturing by installing a plurality of cameras in a facility such as a stadium or a concert hall will be described with reference to FIG. 1. An image processing system 100 includes a camera system 110, a switching hub 120, a time server 130, an information processing apparatus 10, and a user terminal 200. The information processing apparatus 10 includes a three-dimensional model generation unit 140, a storage device 150, a visibility data determination unit 160, an output unit 170, a line 180, and a line determination unit 190. The user terminal 200 includes a control unit 210, a virtual viewpoint image generation unit 220, a virtual camera operation unit 230, and a virtual viewpoint image output unit 240. Note that the switching hub 120 and/or the time server 130 may be included in the information processing apparatus 10. In addition, the three-dimensional model generation unit 140 and the like may be an external apparatus of the information processing apparatus 10.

Figure 8:
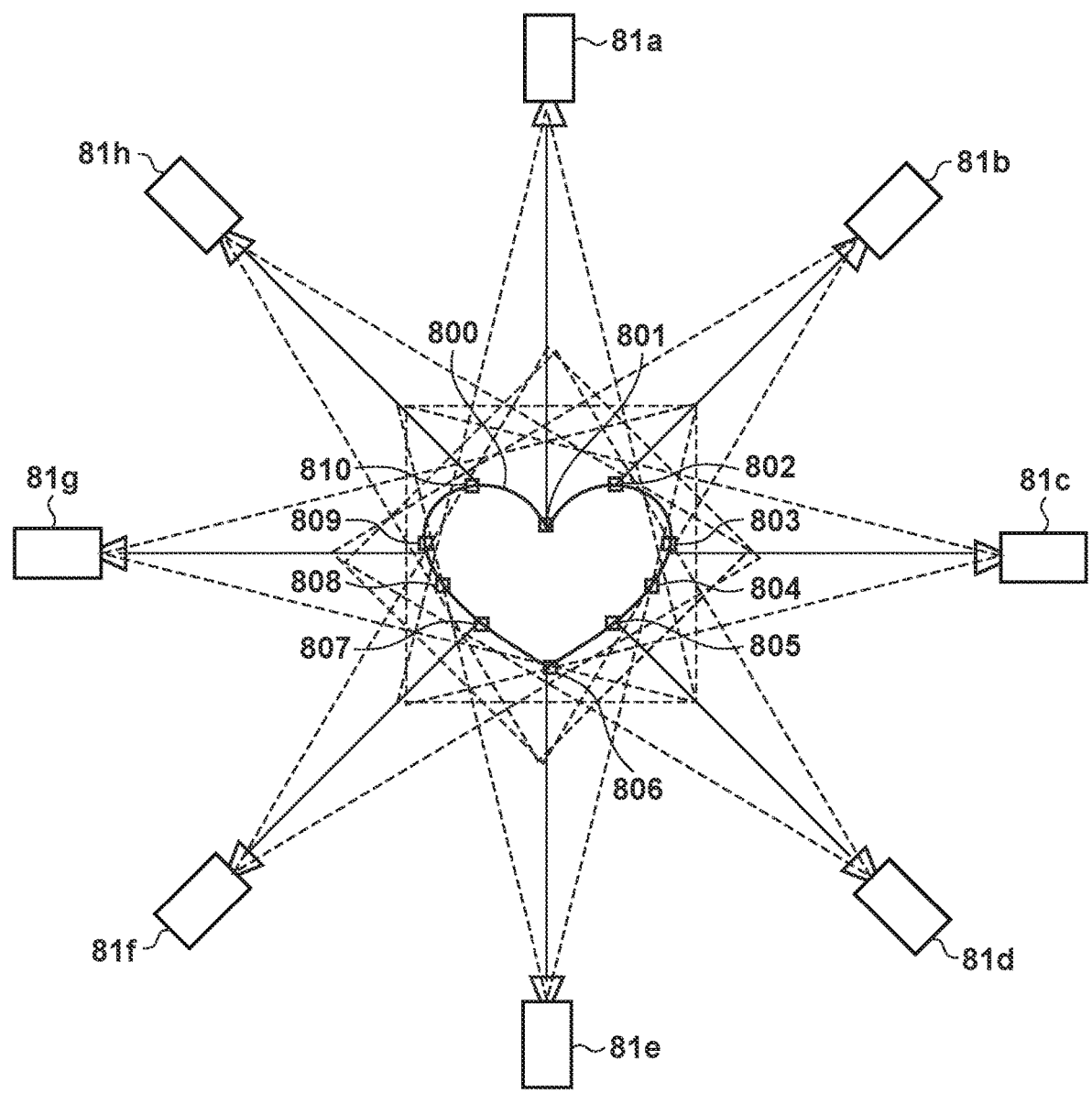
FIG. 8 is a view showing an example of the relationship between a plurality of cameras and an object.

The camera system 110 is formed from a plurality of cameras and is arranged so as to surround an object. FIG. 8 shows the state of this arrangement. A plurality of cameras 81 (cameras 81a to 81h) in the camera system 110 form the camera system 110 and are arranged so as to surround an object 800. However, the number and the arrangement of the plurality of cameras 81 are not limited to those shown in FIG. 8. The plurality of cameras 81 are connected by a network and are connected to the switching hub 120. The time server 130 transmits a synchronization signal to each of the plurality of cameras 81 via the switching hub 120 and the network. The plurality of cameras 81 capture images of the object 800 in synchronization based on this synchronization signal.

Referring back to FIG. 1, the information processing apparatus 10 provides data for generating a virtual viewpoint image from the plurality of images captured by the plurality of cameras forming the camera system 110. Assume that the term "image" used in the description includes a still image and a moving image. That is, the camera system 110 may capture a still image or a moving image. A virtual viewpoint image generated by the image processing system 100 may be a still image or a moving image. In the information processing apparatus 10, the three-dimensional model generation unit 140 receives the captured images and generates, by a method to be described below, each foreground image, a three-dimensional model (for example, a point cloud) expressing an object shape, and visibility data (visibility information). The three-dimensional model is data expressing the three-dimensional shape of an object (for example, an athlete) that is captured by at least one of the cameras included in the camera system 110. In the following description, assume that components of a three-dimensional model are expressed by points and that the three-dimensional model is formed by a point cloud. However, the present invention is not limited to this. The components of the three-dimensional model may be expressed by meshes, and the three-dimensional model may be formed by a set of meshes. Visibility data is data expressing whether the positions of the points forming the point cloud can be observed (whether the point positions are visible) from the respective positions of the plurality of cameras 81. For example, with respect to a given point, 1 is set if the point is observed by a given camera of the cameras 81, and 0 is set if the point is not observed by the given camera. In other words, the visibility data is information that can identify whether a pixel which corresponds to a component of a given three-dimensional model is included in a captured image for each of the plurality of captured images. The storage device 150 stores material data for generating a virtual viewpoint image. For example, the storage device 150 accumulates and stores each foreground image, the three-dimensional model, and the visibility data generated by the three-dimensional model generation unit 140. The storage device 150 can be formed from a hard disk, a memory, or the like, and may simply be a buffer.

The visibility data determination unit 160 and the output unit 170 select and output, based on the visibility data, data to be provided from the virtual viewpoint image generation data stored in the storage device 150 to the virtual viewpoint image generation processing. The visibility data determination unit 160 calculates the contribution (to be described later) of each camera from the accumulated visibility data and selects the data to be output to the user terminal 200 which is to perform the virtual viewpoint image generation processing. In this embodiment, the visibility data determination unit determines which camera's foreground image is to be transmitted to the user terminal 200. The output unit 170 receives the time of the image data required to generate a virtual viewpoint image from the user terminal 200 (the control unit 210) and outputs, to the user terminal 200, the foreground image, the three-dimensional model, and the visibility data selected by the visibility data determination unit 160. The line 180 is a line for performing data communication between the output unit 170 and the user terminal 200. The line determination unit 190 determines the transmission capacity of the line 180.

The user terminal 200 displays the virtual viewpoint image in accordance with the operation of a virtual camera performed by a user. The control unit 210 performs, via the network, operation state management and parameter setting control on each of the blocks forming the image processing system 100. The control unit 210 also outputs, to the output unit 170, time information expressing the frame in which the virtual viewpoint image is to be generated. The virtual camera operation unit 230 sets, in accordance with the operation of the virtual camera performed by the user via a user interface (not shown), the position, the angle of view, the direction, and the like of the virtual camera. The virtual viewpoint image generation unit 220 receives the data required for generating the virtual viewpoint image and performs the virtual viewpoint image generation processing. In the virtual viewpoint image generation processing, a virtual viewpoint image is generated based on the input data, the position, the angle of view, and the direction of the virtual viewpoint, and the like. The generated virtual viewpoint image is displayed on a display, transferred as image data to another device, or accumulated in a storage apparatus via the virtual viewpoint image output unit 240.

The arrangement and the operation of the three-dimensional model generation unit 140 will be described next. The three-dimensional model generation unit 140 according to the first embodiment processes the images obtained from the camera system 110 and generates the three-dimensional model, the foreground images, and the visibility data.

The three-dimensional model generation unit 140 generates a three-dimensional model or cuts out (extracts), as the foreground image, each partial image including a target object such as an athlete or the like from each frame of a captured image. Various kinds of methods can be used for the generation of the three-dimensional model. For the generation of the three-dimensional model according to this embodiment, for example, processing to generate a silhouette image of the object and processing to estimate a three-dimensional model are used. A silhouette image is a binary image in which an object region is expressed in white and a region other than the object region is expressed in black, and the silhouette image can be generated by a general method. For example, it is possible to employ a background difference method of calculating a difference between a captured image which includes an object and a background image which was captured beforehand when the object was not present such as before a game and setting a region whose difference is equal to or more than a threshold as a silhouette region (foreground region). Of course, the method of generating a silhouette image is not limited to this. For example, the silhouette image may be generated by using a human body recognition method or the like.

The three-dimensional model generation unit 140 uses the camera information and the silhouette image generated by using the images from the plurality of cameras 81 to estimate the three-dimensional model of the object. For example, a visual hull method is employed as the method of the estimation of the three-dimensional model. A point cloud (a set of points that have three-dimensional coordinates) expressing the three-dimensional model of the object is obtained as a result of this processing. The three-dimensional model generation unit 140 associates a frame number (for each frame time) with the three-dimensional model (point cloud data) and writes this information in the storage device 150. The three-dimensional model generation unit 140 estimates, from the positional relationship of the three-dimensional model and the camera system and the like, the distance (distance information) between each camera and the points of the point cloud of the three-dimensional model. The three-dimensional model generation unit 140 uses the three-dimensional model and the estimated distance information to determine the visibility which indicates whether the points of the three-dimensional model can be observed from each camera. The three-dimensional model generation unit 140 associates a frame number (for each frame time) with the result of this determination as visibility data (to be described later with reference to FIG. 9) and stores the visibility data and the associated frame number in the storage device 150. In addition, the three-dimensional model generation unit 140 sets, as a foreground image, an image obtained by extracting a portion determined to be a foreground region from an image captured by each camera of the camera system 110, and writes, in the storage device 150, the set foreground image in association with the frame number (frame time) and the camera. Note that the storage device 150 can associate and store each foreground image with the image capturing time and the identifier of the camera which captured the image.

In a case in which the control unit 210 of the user terminal 200 transmits a request to the output unit 170 in order to start the generation of the virtual viewpoint image, the output unit 170 opens the line 180 and prepares for transmission. The line determination unit 190 grasps, in accordance with this operation, the line status of the line 180 and calculates the capacity transmissible by the line 180 from the information processing apparatus 10 to the user terminal 200 which is the external apparatus. Based on this capacity, the data amount to be transmitted from the information processing apparatus 10 to the user terminal 200, that is, the data amount (total amount) provided for the virtual viewpoint image generation processing will be determined so as not to exceed the capacity. The visibility data determination unit 160 receives the visibility data stored in the storage device 150 and performs visibility data determination processing. In the visibility data determination processing, the data to be transmitted from the output unit 170 is selected by receiving the capacity transmissible by the line 180 from the line determination unit 190. In the first embodiment, a first contribution, which becomes higher as the number of the observable points of the three-dimensional model increases, is calculated for each of the plurality of cameras based on the visibility data, and the foreground image to be provided for the generation of the virtual viewpoint image is selected in accordance with the first contribution calculated for each of the plurality of cameras.

Figure 2:
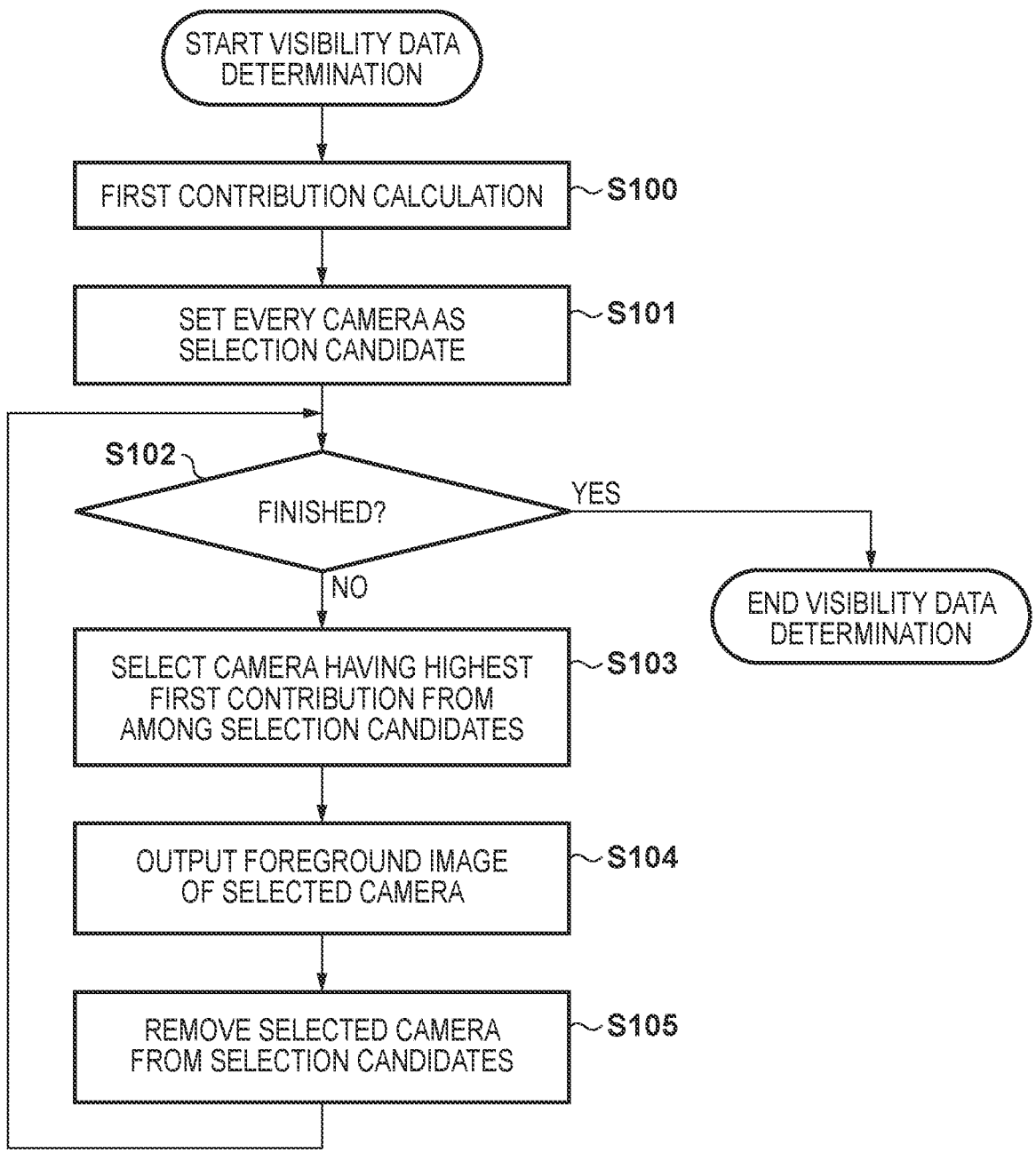
FIG. 2 is a flowchart illustrating visibility data determination processing according to the first embodiment.

FIG. 2 is a flowchart illustrating the visibility data determination processing according to the first embodiment. Although this flowchart illustrates the processing performed in one frame time, the processing can be performed on all of the captured images by performing the same operation for each frame time. The example of the camera system shown in FIG. 8 will be used for the sake of descriptive convenience. In addition, prior to processing, the output unit 170 will obtain, from the storage device 150, the three-dimensional model and its visibility data of the frame time to be processed, output the three-dimensional model and its visibility data from the line 180 to the user terminal 200, and transmit the data amount of the three-dimensional model and its visibility data to the line determination unit 190.

In step S100, the visibility data determination unit 160 obtains, from the storage device 150, the three-dimensional model and its visibility data of the frame time to be processed and calculates the first contribution of each camera. FIG. 8 shows an example of the relationship between the plurality of cameras 81 and the object 800. FIG. 9 also shows an example of the visibility data for each camera and the object shown in FIG. 8. In FIG. 9, for the sake of descriptive convenience, points 801 to 810 will be exemplified as the representative points of the object 800 shown in FIG. 8. Note that the number of the representative points is not limited this. The visibility data may be provided for every point belonging to the three-dimensional model or the visibility data may be provided for each point obtained by thinning out all of the points of the three-dimensional model in accordance with a predetermined rule. In FIG. 9, the columns indicate the respective cameras 81a to 81h of the camera system 110, and the rows indicate the respective points 801 to 810 in the three-dimensional model of the object 800. "1" indicates that the point is observable from the camera 81. Also, although "0" indicating that the point is not observable from the camera 81 is not particularly noted and the relevant cell is left blank in this embodiment, "0" may be input to the relevant cell. The sum of the number of the observable points of the three-dimensional model for each camera 81 is indicated in the bottom row. For example, if three points can be observed from the camera 81a, the first contribution of the camera 81a is 3. Note that the first contribution is not limited to this, and the first contribution may be, for example, indicated by a ratio obtained by dividing the number of observable points by the total number of points. The first contribution set for each camera in this manner can be referred to as the priority of the captured image (or the foreground image) obtained by the camera, and the first contribution is determined based on the number of components of the three-dimensional shape model corresponding to the pixels of the image.

In step S101, the visibility data determination unit 160 sets all of the cameras (the cameras 81a to 81h in this example) as selection candidates. For example, a selection candidate determination can be performed for each camera by setting a candidate flag to each camera, initially assigning "1" to each candidate camera, and changing the candidate flag of each camera that is removed from the selection candidates to "0".

In step S102, the visibility data determination unit 160 determines whether the visibility data determination processing has been completed. For example, the visibility data determination unit 160 subtracts, from the capacity transmissible by the line 180, the data amount of the three-dimensional model and its visibility data and the capacity that is used to transmit the foreground image of the camera selected from the selection candidates. The visibility data determination unit 160 continues performing the processes of steps S103 to S105 until the remaining capacity which is obtained as a result of this subtraction is equal to or less than a predetermined value. Note that the transmissible capacity of the line 180 and the data amount of the three-dimensional model and its visibility data are obtained from the line determination unit 190. Alternatively, the line determination unit 190 may set, based on the capacity transmissible by the line 180 and the data amount of the three-dimensional model and its visibility data, the number of cameras that can transmit the foreground image. In this case, the visibility data determination unit 160 repeats the processes of steps S103 to S105 until the number of selected cameras reaches the number of cameras set by the line determination unit 190. If it is determined in step S102 that the visibility data determination processing is to be ended, the visibility data determination processing shown in FIG. 2 ends. Otherwise, the process advances to step S103.

In step S103, the visibility data determination unit 160 selects, from the selection candidate cameras, each camera with the highest first contribution value. In FIG. 9, the camera 81c and the camera 81g have the highest first contribution value (first contribution=5). The visibility data determination unit 160 selects the camera 81c and the camera 81g. Note that although all of the appropriate cameras are selected here when there are a plurality of cameras with the same value of first contribution, it may be set so that each camera will be sequentially selected one by one from the plurality of appropriate cameras.

In step S104, the output unit 170 reads out, from the storage device 150, the foreground images of the selected cameras, the camera 81c and the camera 81g in this case, of the frame time to be processed and outputs the foreground images from the line 180 to the user terminal 200. In step S105, the visibility data determination unit 160 removes the selected cameras, that is, the camera 81c and the camera 81g, from the selection candidates. For example, the cameras 81c and 81g can be removed from the selection candidates by changing the candidate flags of the cameras 81c and 81g which were set to "1" in step S101 to "0". Subsequently, the process returns to step S102, and the above-described processes are repeated.

In this manner, the processes from step S103 to step S105 are repeated until the completion condition of the process of step S102 is satisfied. When the process of step S103 is performed for the first time as described above, the cameras 81c and 81g that have the highest first contribution value are selected. When the process of step S103 is performed for the second time, each camera with the highest first contribution value is selected from the cameras 81a, 81b, 81d, 81d, 81e, 81f, and 81h which are remaining as the selection candidates. In the example of FIG. 9, the cameras with the highest first contribution value among these cameras are the camera 81d and the camera 81e. In step S104, the foreground images of these cameras 81d and 81e are output, and these cameras are removed from the selection candidates in step S105.

Based on the above-described processing, each three-dimensional model, its corresponding visibility data, and each foreground image with a high first contribution value are transmitted to the virtual viewpoint image generation unit 220 of the user terminal 200 via the line 180. The virtual viewpoint image generation unit 220 uses each three-dimensional model, its corresponding visibility data, and the foreground image to generate a virtual viewpoint image corresponding to the virtual viewpoint designated from the virtual camera operation unit 230. Note that the virtual viewpoint is time information specifying the three-dimensional position on the world coordinate system, the orientation (the direction of the virtual camera), the focal length, the principal point (the center of the virtual camera image), and the input data. The virtual viewpoint is input, for example, by the user by using an apparatus such as a joystick included in the virtual camera operation unit 230. An image generated by the virtual viewpoint image generation unit 220 is output from the virtual viewpoint image output unit 240 and is displayed and/or recorded.

As described above, in the image processing system according to the first embodiment, each appropriate foreground image is selected in relation to the virtual viewpoint image generation with respect to a limit such as the capacity of transmission. As a result, required data can be provided for the virtual viewpoint image generation processing while suppressing the capacity of transmission. In addition, since the information required for the generation of the virtual viewpoint image can be transmitted without depending on a virtual viewpoint, it is possible to generate virtual viewpoint image of a different virtual viewpoint from the transmitted data.

Figures 14, 15, 16:
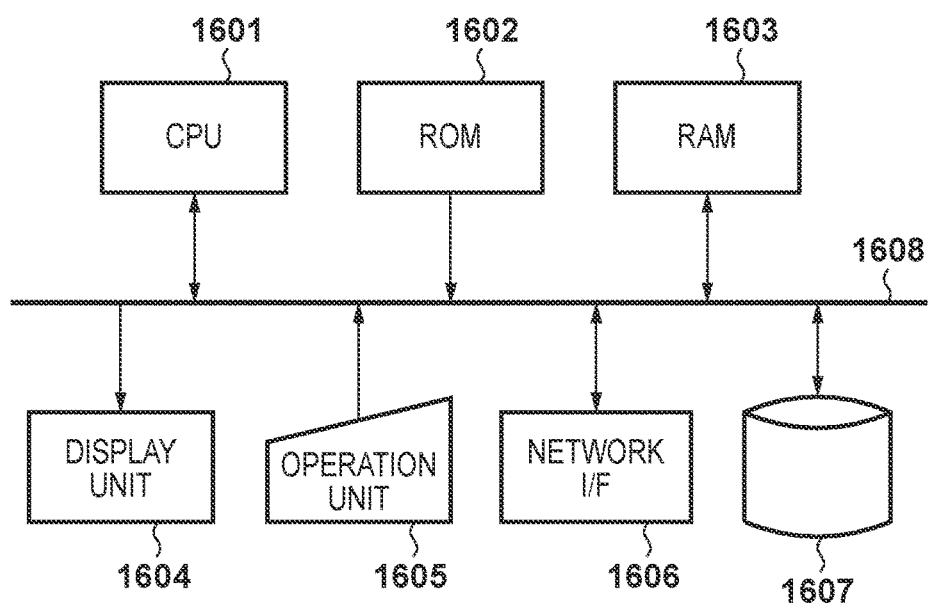
FIG. 14 is a table expressing an example of visibility determination processing.
FIG. 15 is a table expressing an example of the priority values.
FIG. 16 is a block diagram showing an example of the hardware arrangement of an information processing apparatus.

Note that the image processing system 100 according to this embodiment is not limited to the physical arrangement described above and may be arranged logically. Each component may be implemented by hardware or by a computer that includes operating software. For example, FIG. 16 is a block diagram showing an example of the hardware arrangement applicable to the information processing apparatus 10 and the user terminal 200. A CPU 1601 implements each functional unit shown in FIG. 1 by executing a program stored in a ROM 1602 or a RAM 1603. The ROM 1602 is a read-only nonvolatile memory, and the RAM 1603 is a volatile memory that can be read and written at any time.

A display unit 1604 performs various display operations under the control of the CPU 1601. For example, in the user terminal 200, the display unit displays the virtual viewpoint image output from the virtual viewpoint image output unit 240. An operation unit 1605 accepts operation instructions from the user made via a keyboard, a mouse, a touch panel, and the like. The operation unit 1605 partially forms the virtual camera operation unit 230 of the user terminal 200. A network interface 1606 is an interface for connecting to the network or the line. In the information processing apparatus 10, the network interface 1606 is connected to the switching hub 120 and receives an image from the camera system 110. In the user terminal 200, the network interface 1606 is connected to the line 180. A secondary storage device 1607 is, for example, a hard disk and is used as the storage device 150.

Note that although the contribution is calculated by using representative points of the point cloud of the three-dimensional model in the embodiment described above, the present invention is not limited to this. For example, the contribution may be calculated by using all of the points of the three-dimensional model or points that have been thinned out at equal intervals.

Second Embodiment

An image processing system according to the second embodiment will be described hereinafter. In the first embodiment, each foreground image to be provided for the virtual viewpoint image generation processing was selected, from the plurality of foreground images obtained from the plurality of cameras of the camera system 110, based on the capacity limit of the data transmission line and the priority obtained from the visibility data. The second embodiment will describe an example in which the storage capacity of a storage device that stores the data to be provided for the virtual viewpoint image generation processing will be used as the capacity limit that can be used to provide data. Also, although each foreground image was selected in accordance with a priority order based on the first contribution in the first embodiment, the camera priority order (the order of the cameras to be selected) is determined by further considering the camera dependency (to be described later) of each point forming the three-dimensional model in the second embodiment.

Figure 3:
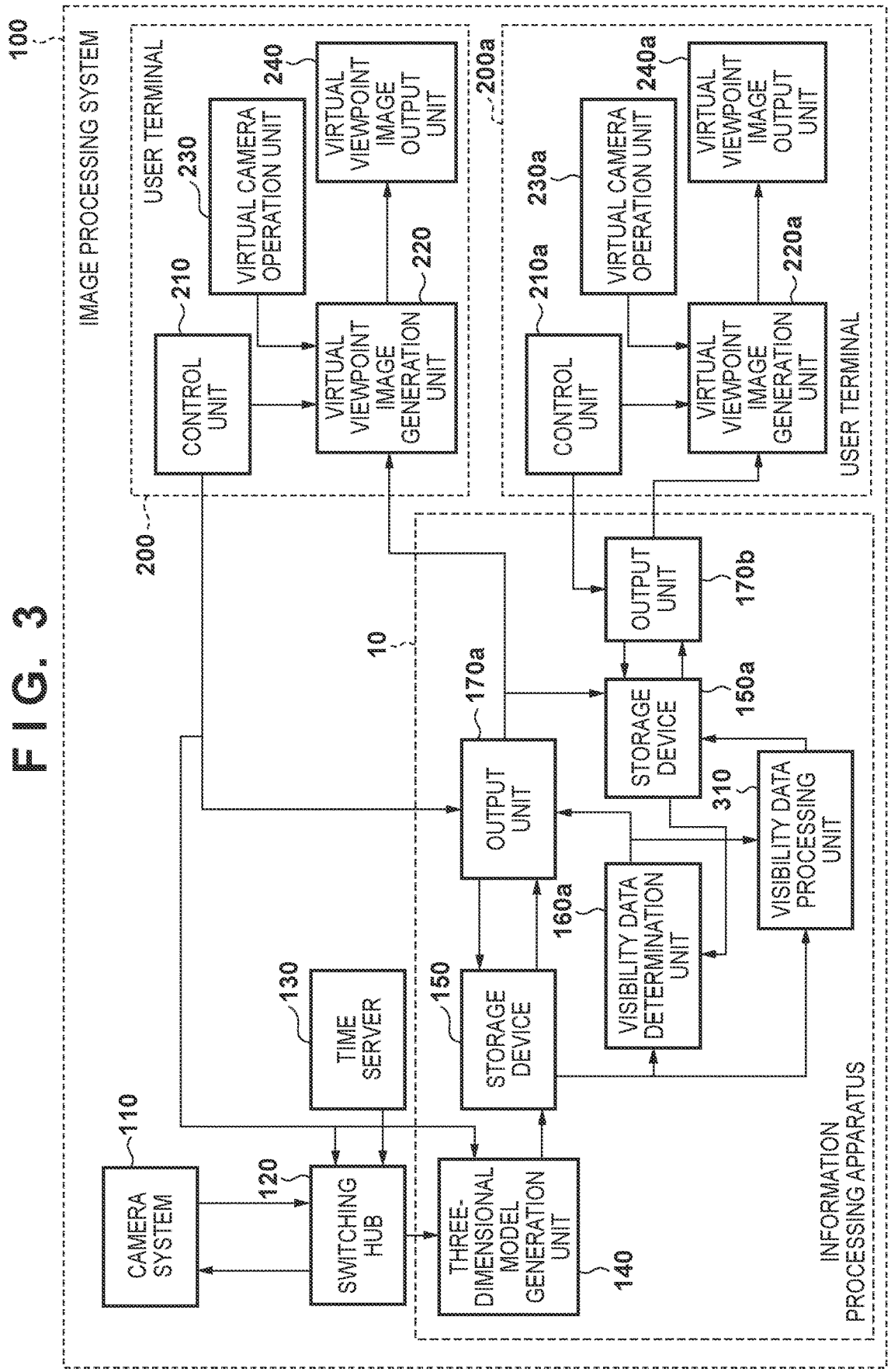
FIG. 3 is a block diagram showing an example of the functional arrangement of an image processing system 100 according to the second embodiment.

FIG. 3 is a block diagram showing an example of the arrangement of an image processing system 100 according to the second embodiment. In FIG. 3, components having the same functions as those of FIG. 1 are denoted by the same reference numerals as those of FIG. 1. In FIG. 3, a visibility data determination unit 160a determines the visibility data by a method (to be described later with reference to FIG. 4) different from that of the first embodiment. A storage device 150a stores data to be provided to the virtual viewpoint image generation processing and can be set to have a capacity smaller than that of the storage device 150. The output destinations of an output unit 170a are a virtual viewpoint image generation unit 220 and the storage device 150a. An output unit 170b reads out, from the storage device 150a, the data for the virtual viewpoint image generation processing and transmits the data to a user terminal 200a. A visibility data processing unit 310 processes, based on the determination result of the visibility data determination unit 160a, the visibility data read out from the storage device 150 and stores the processed data in the storage device 150a. The user terminal 200a has the same arrangement as a user terminal 200 and includes a control unit 210a, a virtual viewpoint image generation unit 220a, a virtual camera operation unit 230a, and a virtual viewpoint image output unit 240a.

In the same manner as in the first embodiment, in a camera system 110, a plurality of cameras capture images in synchronization in accordance with a synchronization signal from a time server 130, and the captured images are transmitted to a three-dimensional model generation unit 140 via a switching hub 120. The three-dimensional model generation unit 140 receives each captured image and generates a foreground image, a three-dimensional model, and visibility data by using the method described in the first embodiment. In the same manner as the first embodiment, the generated foreground image is stored for each frame time and each camera, and the three-dimensional model and the visibility data are stored for each frame time.

The visibility data determination unit 160a obtains, before the processing, information related to the capacity of the storage device 150a. Subsequently, the visibility data determination unit 160a receives the visibility data for each frame time from the storage device 150 and performs the visibility data determination processing (to be described later). The visibility data determination unit 160a calculates the data capacity that can be stored in the storage device 150a, and selects the data (foreground image) which is to be output from the output unit 170a and to be recorded in the storage device 150a. The output unit 170a outputs the selected the foreground image based on the result of the visibility data determination unit 160a. Note that a description in which the output unit 170a selects data and records the data in the storage device 150a will be given mainly in the second embodiment. However, a camera (foreground image) is selected based on the capacity of the storage device 150a in a state in which a line 180 has a sufficient capacity of transmission and processing shown in FIG. 4 (to be described later) is applied to the visibility data determination processing of selecting the foreground image.

Figure 4:
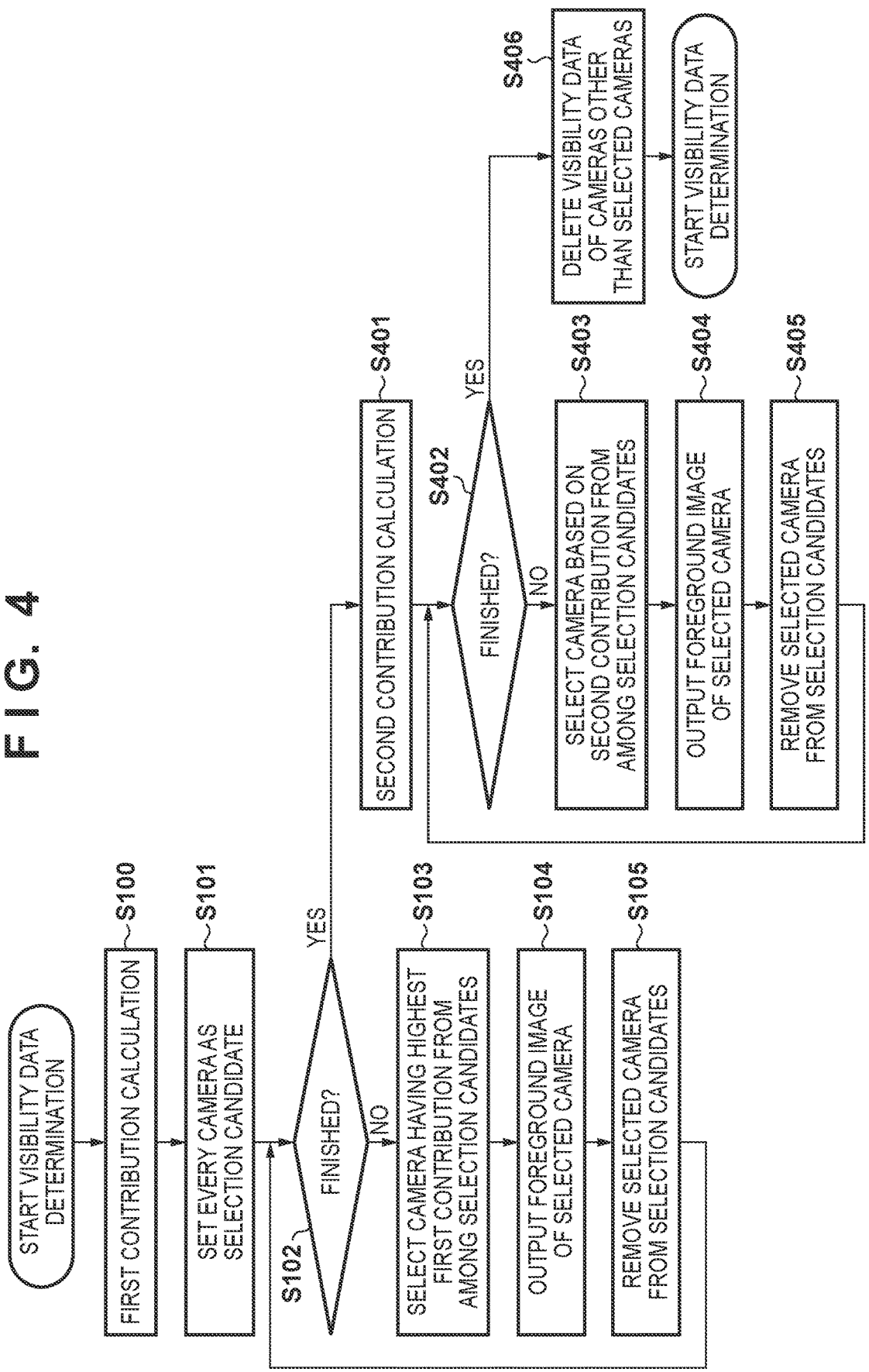
FIG. 4 is a flowchart illustrating visibility data determination processing according to the second embodiment.

FIG. 4 is a flowchart illustrating the visibility data determination processing according to the second embodiment. Although this flowchart illustrates the processing performed in one frame time, the processing can be performed on all of the captured images by performing the same operation for each frame time. The example of the camera system shown in FIG. 8 will be used for the sake of descriptive convenience. In addition, the same step numbers are used to denote processes that are the same as those illustrated in FIG. 2.

Before the start of the processing, the output unit 170a obtains, from the storage device 150, each three-dimensional model of the frame time to be processed. The output unit 170a transmits the obtained three-dimensional model to the user terminal 200 (a virtual viewpoint image generation unit 220) and the storage device 150a. The storage device 150a stores the three-dimensional model on a frame time basis. Note that although the output unit 170a will output the visibility data to the user terminal 200 at this point, it will not output the visibility data to the storage device 150a.

In step S100, the visibility data determination unit 160a obtains, from the storage device 150, the three-dimensional model and its visibility data of the frame time to be processed and calculates the first contribution for each camera. The calculation of the first contribution is performed in the manner described in the first embodiment. In step S101, the visibility data determination unit 160a sets all of cameras 81a to 81h as the selection candidates. For example, in the same manner as the first embodiment, a candidate flag is set to each camera and "1" is initially assigned to each candidate flag. When a camera is to be removed from the selection candidates, this candidate flag will be changed to "0".

In step S102, the visibility data determination unit 160a determines whether the camera selection based on the first contribution has been completed. For example, the visibility data determination unit 160a subtracts, from the recordable capacity on a frame time basis of the storage device 150a, the data amount of the three-dimensional model and the data amount required to record the foreground image obtained from each camera selected from the selection candidates. The visibility data determination unit 160a continues to perform the process until the remaining recordable capacity of the storage device 150a obtained in this manner is equal to or less than first predetermined value. When the completion of the camera selection based on the first contribution is determined, the process advances from step S102 to step S401. Otherwise, the process advances from step S102 to step S103.

In step S103, the visibility data determination unit 160a selects, from the selection candidate cameras, each camera with the highest first contribution value. In step S104, the output unit 170a reads out, from the storage device 150, the foreground image of the corresponding frame time of each selected camera and outputs the readout foreground image to the storage device 150a. The storage device 150a records the received foreground image. In step S105, the visibility data determination unit 160a removes each selected camera from the selection candidates. Subsequently, the process returns to step S102, and the process advances to step S401 when the remaining recordable capacity of the storage device 150a becomes equal to or less than the first predetermined value. In this example, assume that the recording operation to the storage device 150a performed based on the first contribution is completed by the selection of the camera 81c and the camera 81g.

In step S401, a second contribution for each point of the point cloud forming the three-dimensional model is calculated based on the visibility data. A description of this will be given by using the example of the visibility data shown in FIG. 9 in the same manner as the first embodiment. In FIG. 9, the number of cameras that can observe each point is indicated in the rightmost column. For example, a point 801 is a point that can be observed by only one camera (the camera 81a), and the number of cameras that can observe the point is 1. In addition, a point 806 is a point that can be observed by five cameras, and the number of cameras that can observe the point is 5. The second contribution is a value obtained by dividing the number of cameras that can observe the point by the total number of cameras. In the example of FIG. 9, for example, the second contribution of the point 801 is 8/1, and the second contribution of the point 806 is 8/5. Note that the second contribution is not limited to this and may be, for example, expressed by a reciprocal of the number of cameras that can observe the point. In this case, the second contribution of the point 801 will be 1/1, and the second contribution of the point 806 will be 1/5. That is, the second contribution value expresses the dependency of each point to a specific camera, and the smaller the number of the cameras that can observe the point is, the higher the dependency of the point is to a specific camera. The visibility data determination unit 160a selects a camera that captures a point which has high dependency (second contribution) to this camera. The second contribution, which is set in this manner, is a priority of the components of the three-dimensional shape model, and it can be said that the second contribution is determined based on the number of captured images including a pixel corresponding to a component among the plurality of captured images obtained by the plurality of cameras.

In step S402, the visibility data determination unit 160a determines whether to end the camera selection based on the second contribution. For example, a second predetermined value (the first predetermined value>the second predetermined value) is set based on a value obtained by subtracting, from the recordable capacity on a frame time basis of the storage device 150a, the data amount of the three-dimensional model and the capacity recording the foreground image of each camera selected based on the first contribution. Note that each of the first predetermined value and the second predetermined value may be a fixed value that has been determined in advance. In step S402, the visibility data determination unit determines that the selection based on the second contribution has been completed when the remaining recordable capacity becomes equal to or less than the second predetermined value. If it is determined that the selection based on the second contribution has been completed, the process advances from step S402 to step S406. Otherwise, the process advances from step S402 to step S403.

In step S403, a point with the highest second contribution value is extracted and a camera that can capture this point is selected from the selection candidates. The point 801 has the highest second contribution value in FIG. 9, and the camera 81a that captures this point is selected. In step S404, the output unit 170a reads out, from the storage device 150, the foreground image of the frame time to be processed of the selected camera (the camera 81a), and records the obtained foreground image in the storage device 150a. In step S405, the visibility data determination unit 160a removes the selected camera (the camera 81a in this case) from the selection candidates. More specifically, in the same manner as in step S105, the candidate flag of the appropriate camera is changed to "0". Subsequently, the process returns to step S402. The processes of step S403 to step S405 are repeated until the remaining recordable capacity of the storage device 150a becomes equal to or less than the second predetermined value hereinafter.

In step S406, the visibility data processing unit 310 receives, from the storage device 150, the visibility data used for the determination, and generates visibility data obtained by deleting the visibility data of each camera other than the cameras that have been selected up to step S402. In the example described above, the sets of visibility data of cameras other than the cameras 81a, 81c, and 81g are deleted. FIG. 10 shows an example of the generated visibility data. Only the visibility data of the selected cameras 81a, 81c, and 81g remains. The visibility data generated by the visibility data processing unit 310 is associated with the frame time and recorded in the storage device 150a. Subsequently, the visibility data determination processing ends.

According to the above-described processing, each foreground image selected based on the first contribution and the second contribution, the three-dimensional model, and the visibility data obtained by deleting a data amount is recorded in the storage device 150a. When a frame time is input from the control unit 210a, the output unit 170b provides, to the user terminal 200a, the three-dimensional model, the foreground image, and the visibility data corresponding to this frame time which are stored in the storage device 150a. The user terminal 200a obtains, from the output unit 170b, the three-dimensional model, the foreground image, and the visibility data, and generates a virtual viewpoint image by performing the same processing as that of the user terminal 200. That is, when the frame time for generating the virtual viewpoint image is received from the control unit 210a, the output unit 170b is made to output the corresponding three-dimensional model, its visibility data, and the foreground image. The virtual viewpoint image generation unit 220a generates, based on the three-dimensional model, its visibility data, and the foreground image provided from the output unit 170b, the virtual viewpoint image corresponding to the virtual viewpoint designated from the virtual camera operation unit 230a. The image generated by the virtual viewpoint image generation unit 220a is output from the virtual viewpoint image output unit 240a for display and/or for recording.

Based on the arrangements and the operations described above, it is possible to record data required for the generation of a virtual viewpoint image while suppressing the storage capacity by selecting each appropriate foreground image with respect to a limit such as the storage capacity or the like. Also, since the transmission of a foreground image that includes a point with a high dependency to a specific camera is prioritized based on the second contribution, each foreground image at least necessary for coloring all of the points of an object 800 will be definitely selected. As a result, even if the foreground images are deleted, it has an effect of reducing the possibility that an unnatural image will be reproduced due to a lack of coloring in the virtual viewpoint image of the object. Therefore, the quality of the virtual viewpoint image that is to be generated on the side of the user can be changed by changing the data amount to be provided to the user in accordance with the difference in the charged money amount or the like.

Note that, by changing the capacity limit from the capacity of the storage device 150a to the capacity of the line 180, it is possible to apply the camera selection (the foreground image selection) described in the second embodiment to the camera selection in the first embodiment. In addition, a line determination unit 190 that was used in the first embodiment may be arranged, and it may be set so that the processing described in the first embodiment will be applied when the output unit 170a is to transmit, to the user terminal 200, the data to be provided for the virtual viewpoint image generation processing. Note that the image processing system 100 according to the second embodiment is not limited to the physical arrangements described above and may be arranged logically. Each component may be implemented by hardware or may be implemented by a computer that includes software for operation.

Third Embodiment

In the first and second embodiments, each foreground image to be provided was selected to make the data to be provided for the virtual viewpoint image generation processing fall within the capacity limit. In the third embodiment, in order to make the data to be provided for the virtual viewpoint image generation processing fall within the capacity limit, each point to be provided will be selected from the data of the point cloud forming the three-dimensional model. In addition, in the third embodiment, a priority is set to every point forming the three-dimensional model, and the data (the point of the three-dimensional model) to be output is selected in accordance with the priority determined according to the capacity limit.

Figure 5:
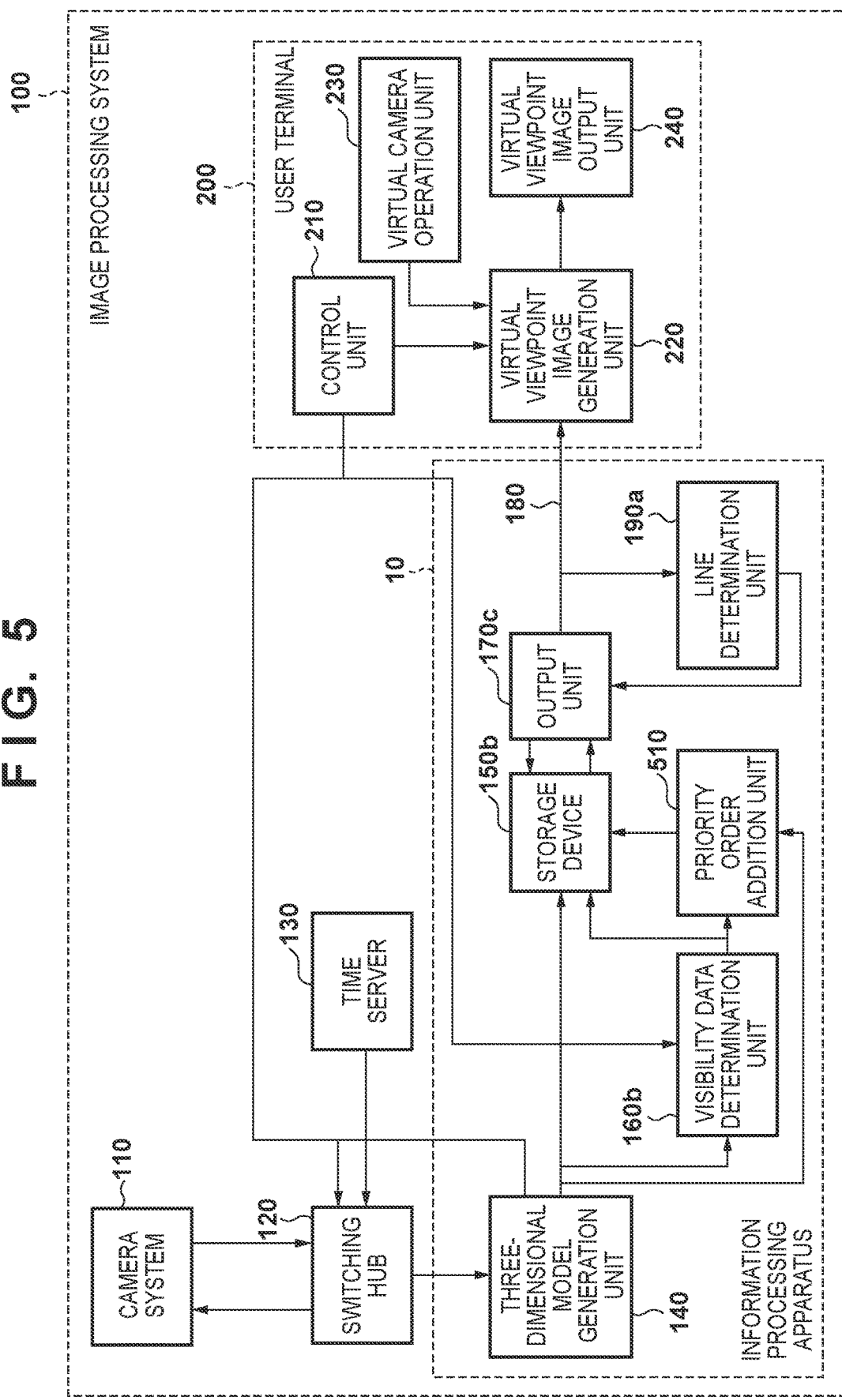
FIG. 5 is a block diagram showing an example of the functional arrangement of an image processing system 100 according to a third embodiment.

FIG. 5 shows a block diagram of the arrangement of an image processing system according to the third embodiment. In FIG. 5, blocks having the same functions as those in FIG. 1 are denoted by the same reference numerals as those in FIG. 1. In FIG. 5, a visibility data determination unit 160b determines the visibility data by a method different from that of the first embodiment. A priority order addition unit 510 adds priority data (to be described later) to target data. A case in which a priority order will be added to a point of a point cloud will be exemplified first in the third embodiment. A storage device 150b records the foreground image, the three-dimensional model, and the visibility data. A line determination unit 190a grasps the line status of a line 180 and determines the priority order of the data (each point of the three-dimensional model in this example) to be transmitted. An output unit 170c selects and outputs the data (a point of the three-dimensional model in this example) in accordance with the priority order determined by the line determination unit 190a.

The virtual viewpoint image generation processing performed by the image processing system according to the third embodiment which includes the arrangement described above will be described next.

In the same manner as the first embodiment, a plurality of cameras of a camera system 110 capture images in synchronization with a synchronization signal of a time server 130 and transmit the captured images to a three-dimensional model generation unit 140 via a switching hub 120. The three-dimensional model generation unit 140 receives the captured images and generates each foreground image, the three-dimensional model data, and the visibility data by the method described in the first embodiment. The generated foreground image is stored for each frame time and each camera, and the three-dimensional model data and the visibility data are stored for each frame time. In addition, the visibility data is input to the visibility data determination unit 160b and the priority order addition unit 510.

The visibility data determination unit 160b receives, from the three-dimensional model generation unit 140, the visibility data for each frame time. The visibility data determination unit 160b performs the visibility data determination processing, which is to be described later with reference to FIG. 6, and sets a priority order to each point of the point cloud of the three-dimensional model to be stored in the storage device 150b. The output unit 170c selects and outputs, based on the determination result of the line determination unit 190a, each point of the point cloud to be output from the storage device 150b.

Figure 6:
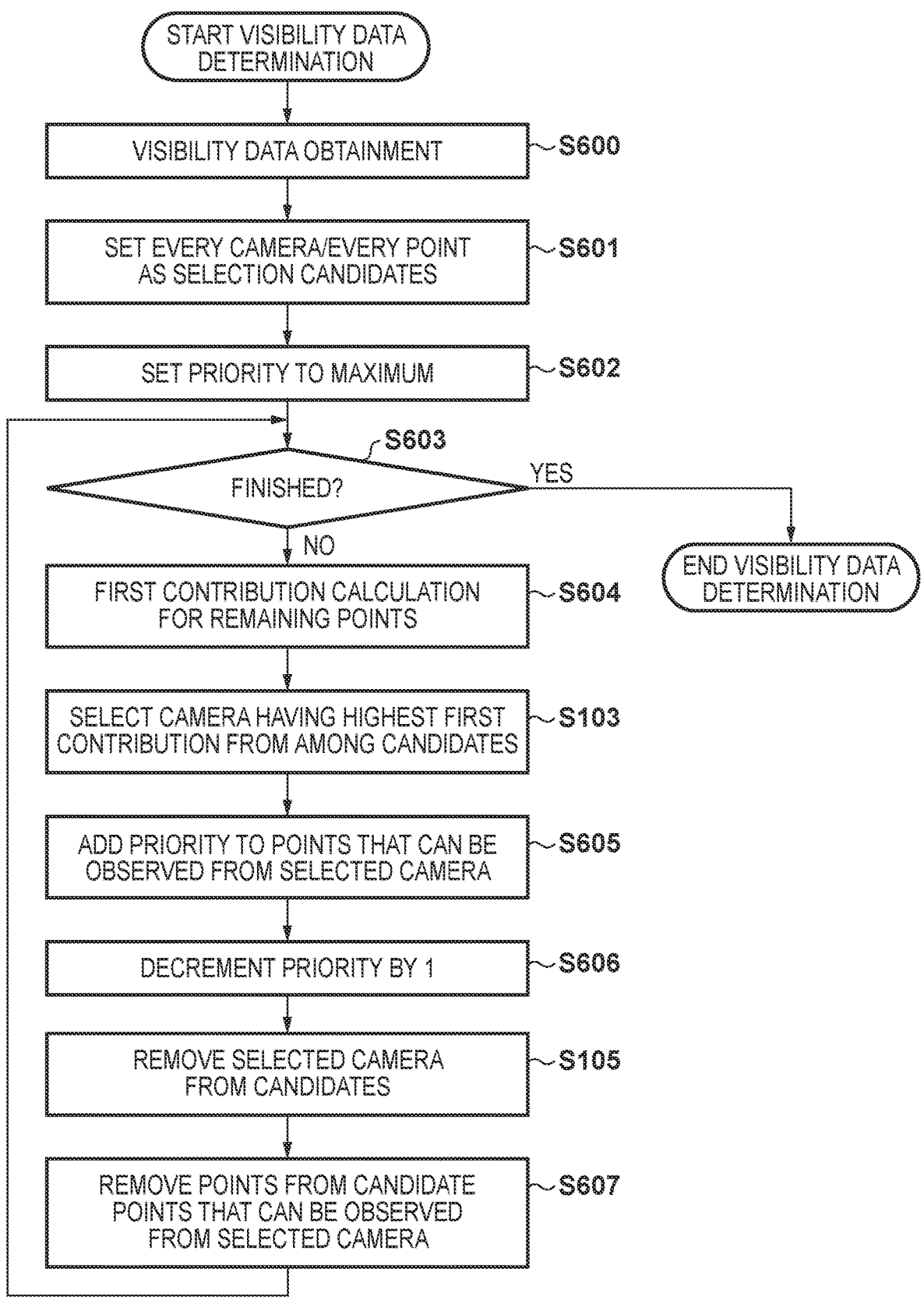
FIG. 6 is a flowchart illustrating visibility data determination processing according to the third embodiment.

FIG. 6 is a flowchart illustrating the visibility data determination processing according to the third embodiment. Although this flowchart illustrates the processing performed in one frame time, the processing can be performed on all of the captured images by performing the same operation for each frame time. The example of the camera system shown in FIG. 8 will be used for the sake of descriptive convenience. In addition, the same step numbers are used to denote processes that are the same as those illustrated in the flowchart of FIG. 2.

In step S600, the visibility data determination unit 160b obtains, from the storage device 150b, a three-dimensional model and its visibility data of a frame time to be processed. In step S601, the visibility data determination unit 160b sets all cameras (cameras 81a to 81h) of the camera system 110 and all points of the point cloud of the three-dimensional model as selection candidates. For example, the visibility data determination unit sets a selection candidate flag for each camera and for each point and initially assigns "1" to each selection candidate flag. When the selection candidate flag is changed to "0", the corresponding camera or point is removed from the selection candidates. In step S602, a priority value to be set to each camera is set to the maximum value that can be selected. In this case, for example, this value is set to 127. The selectable maximum value is not limited to this value as a matter of course, and the total number of cameras of the camera system 110 may be set as the maximum value.

Next, in step S603, the visibility data determination unit determines whether to end the visibility data determination processing. This is determined here by determining whether all of the points of the point cloud forming the three-dimensional model have been selected (whether all of the points have been removed from the selection candidates), and the visibility data determination unit determines to end the processing when all of the points have been selected. If the end of the processing is determined, the visibility data determination processing is completed. Otherwise, the process advances to step S604.

In step S604, the visibility data determination unit 160b calculates, for the cameras set as the selection candidates, a first contribution by using points set as the selection candidates. The calculation of the first contribution is performed in the same manner as that according to the first embodiment. When the process of step S604 is executed for the first time, all of the cameras and all of the points are set as the selection candidates, and the calculation result of the first contribution becomes as that shown on the bottom row of the table shown in FIG. 9. Next, in step S103, the visibility data determination unit 160b selects, from the selection candidates, the camera with the highest first contribution value. Although this applies to the camera 81c and the camera 81g in the example of FIG. 9, it will be assumed here that the camera 81c has been selected.

In step S605, the priority order addition unit 510 adds the priority value to the selected camera 81c and adds the priority value to each point that can be observed from the camera 81c. FIG. 13A shows this state. 127 is set as the priority value to each of points 802 to 806 which are observable from the camera 81c. In step S606, the priority order addition unit 510 decrements the priority value by 1. In this case, the priority value is changed to 126. In step S105, the visibility data determination unit 160b removes the camera 81c from the selection candidates by changing the selection candidate flag of the camera 81c, which was selected in step S103, to "0". In step S607, the visibility data determination unit 160b changes the selection candidate flags of the points 802 to 806 which are observable from the selected camera 81c to "0", thereby removing these points from the selection candidates. Note that since the priority value has been set in step S605, it may be arranged so that points other than those whose priority value is 0 will be removed from the selection candidates.

The process returns to step S603, and the visibility data determination unit 160b determines whether to end the visibility data determination processing. In FIG. 13A, there are points whose priority values are 0, indicating that there are points whose selection candidate flags are set to "1" remaining still at this point. Hence, the processing will not be ended, and the process advances to step S604.

In step S604, the visibility data determination unit 160b calculates the first contribution of the cameras remaining as the selection candidates by using the points remaining as the selection candidates. As a result, values indicated in the bottom row of a table shown in FIG. 11 are calculated as the first contribution values. In step S103, the visibility data determination unit 160b selects, from the selection candidate cameras, the camera with the highest first contribution value. In the example of FIG. 11, the camera 81g will be selected.

In step S605, the priority order addition unit 510 adds the priority value to the selected camera 81g, and adds the priority value to each point that can be observed from the camera 81g, from out of the selection candidate points (unselected points). As shown in FIG. 13B, among the points observable from the camera 81g, 126 is set as the priority value to each of points 807 to 810 which are remaining as the selection candidates. In step S606, the priority order addition unit 510 decrements the priority value by 1. In this case, the priority value is changed to 125. In step S105, the visibility data determination unit 160b removes the selected camera 81g from the selection candidates. In step S607, the visibility data determination unit 160b removes, from the selection candidates, the points 807 to 810 which are observable from the selected camera 81g.

The process returns to step S603, and the visibility data determination unit 160b determines whether to end the visibility data determination processing. In FIG. 13B, there are points whose priority values are 0, indicating that there are points whose selection candidate flags are set to "1" remaining still at this point. Hence, the processing will not be ended, and the process advances to step S604.

In step S604, the visibility data determination unit 160b calculates the first contribution of the cameras remaining as the selection candidates by using the points remaining as the selection candidates. As a result, values indicated in the bottom row of a table shown in FIG. 12 are calculated as the first contribution values. In step S103, the visibility data determination unit 160b selects, from the selection candidate cameras, the camera with the highest first contribution value. In the example of FIG. 12, the camera 81a will be selected.

In step S605, the priority order addition unit 510 adds the priority value to the selected camera 81a, and adds the priority value to each point that can be observed from the camera 81a. As shown in FIG. 13C, among the points observable from the camera 81a, 125 is set as the priority value to a point 801 which is remaining as a selection candidate. In step S606, the priority order addition unit 510 decrements the priority value by 1. In this case, the priority value is changed to 124. In step S105, the visibility data determination unit 160b removes the selected camera 81a from the selection candidates. In step S607, the visibility data determination unit 160b removes, from the selection candidates, the point 801 which is observable from the selected camera 81a.

The process returns to step S603, and the visibility data determination unit 160b determines whether to end the visibility data determination processing. In FIG. 13C, there are no more points whose priority values are 0, indicating that there are no more points whose selection candidate flags are set to "1" at this point. Hence, the visibility data determination unit 160b determines that a priority value has been added to every point and ends the visibility data determination processing. Subsequently, the priority order addition unit 510 stores, in the storage device 150b, the data (FIG. 13C) of the priority values set in the manner described above.

In a case in which a user terminal 200 is to perform virtual viewpoint image generation, a control unit 210 sets, in the same manner as in the first embodiment, a frame time from which the virtual viewpoint image is to be generated. In a virtual viewpoint image generation unit 220, first, the visibility data and each foreground image are read out from the storage device 150b via the output unit 170c. The line determination unit 190a grasps the line status of the line 180 and determines the priority order up to which the data is to be transmitted. First, the line determination unit 190a subtracts, from the line capacity, the data amount of the transmitted visibility data and each foreground image. The line determination unit 190a calculates, from the remaining capacity, the capacity usable for transmitting the three-dimensional model, and determines, based on this calculation, the priority value for transmitting a point of a point cloud that matches the transmissible data amount. For example, a determination may be made so as to "transmit points up to a point whose priority value is 126".

The output unit 170c selects and buffers each point of the three-dimensional model in accordance with the priority value determined by the line determination unit 190a and outputs all of the selected points together to the virtual viewpoint image generation unit 220. The output unit 170c determines each point to be transmitted by referring to the data of the priority value recorded in the storage device 150b. In this case, the data of the point 801 of the point cloud forming the three-dimensional model will not be transmitted. The virtual viewpoint image generation unit 220 generates a virtual viewpoint image by executing coloring processing corresponding to the virtual viewpoint designated from the virtual camera operation unit 230. The image generated by the virtual viewpoint image generation unit 220 is output from a virtual viewpoint image output unit 240 to be displayed and/or to be recorded.

Based on the arrangements and the operations described above, it is possible to transmit required data, in relation to the generation of a virtual viewpoint image, while suppressing the capacity of transmission by selecting the appropriate points of a three-dimensional model with respect to a limit such as the capacity of transmission. In addition, since required information can be transmitted regardless of the virtual viewpoint, it is possible to generate another virtual viewpoint image by changing the virtual viewpoint by using the transmitted data.

Note that although the embodiment described above illustrated an example using representative points of the point cloud of a three-dimensional model, the present invention is not limited to this. For example, all of the points of the three-dimensional model or points that have been thinned out at equal intervals may be used.

In addition, although the third embodiment described a case in which a table (FIG. 13C) indicating the correspondence between the priority and each point of the point cloud is generated and stored, the present invention is not limited to this. For example, it may be set so that visibility data as shown in FIG. 14 will be generated. The visibility data shown in FIG. 14 is, for example, data obtained by causing the priority order addition unit 510 to substitute "1", indicating a visible state in the visibility data shown in FIG. 9, with a priority value. In a case in which such visibility data has been recorded in the storage device 150b, determination as to whether a point can be observed can be made by simply determining whether or not a non-zero value has been added as the priority value.

Furthermore, although the maximum priority value is directly added as the priority value in the third embodiment, the present invention is not limited to this. For example, the priority values may be reassigned by other values after the processing. For example, in the table shown in FIG. 13C, values may be reassigned so as not to change the magnitude relationship. That is, the priority values 127, 126, and 125 may be reassigned as 2, 1, and 0, respectively.

Fourth Embodiment

Figure 7:
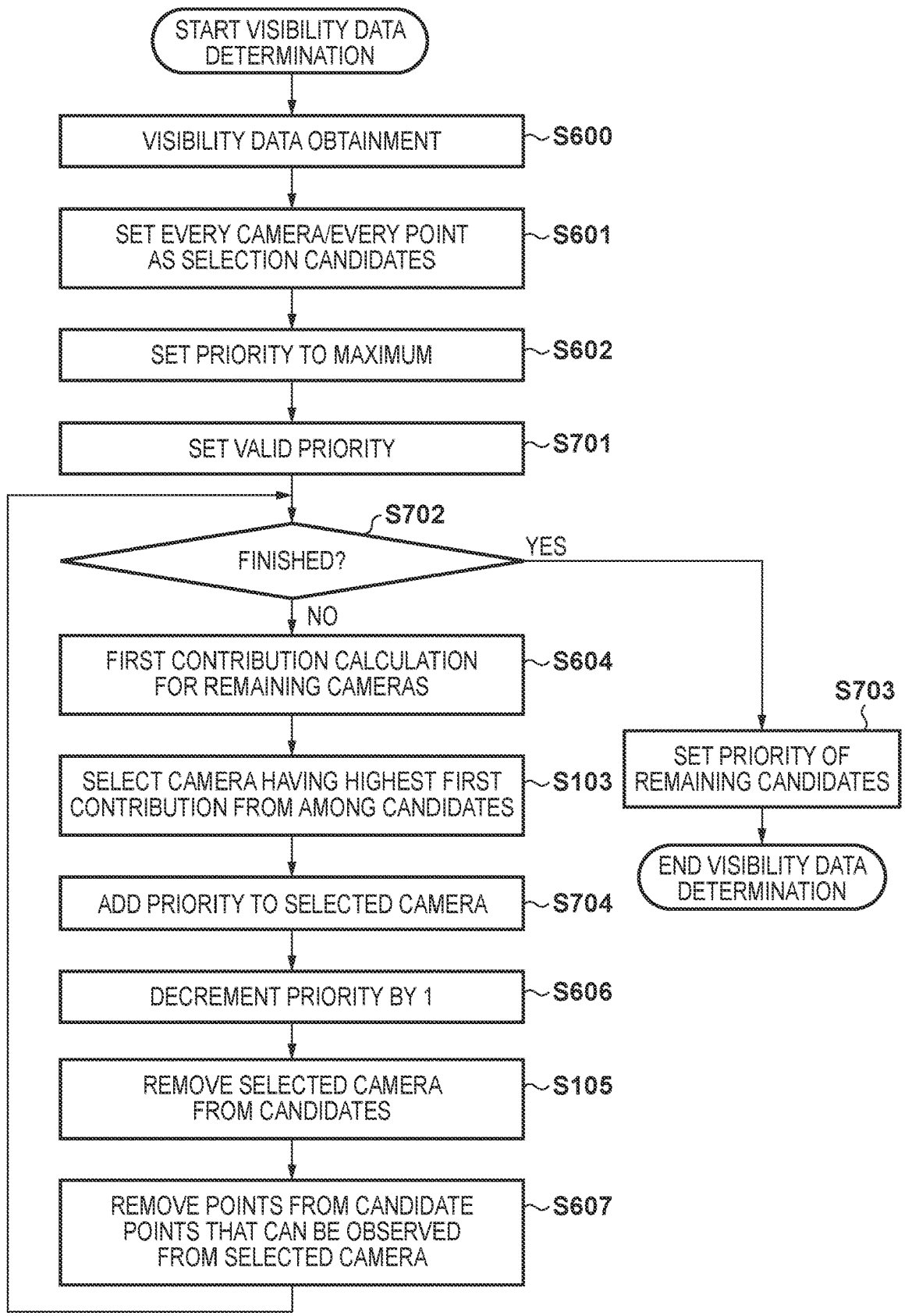
FIG. 7 is a flowchart illustrating visibility data determination processing according to the fourth embodiment.

Although the third embodiment described an arrangement in which the selection of the points of the three-dimensional model to be provided for the virtual viewpoint image generation processing is performed by adding priority values to the respective points of the three-dimensional model, the present invention is not limited to this. Each foreground image to be provided for the virtual viewpoint image generation processing may be selected in the same manner as in the first embodiment. The fourth embodiment describes an arrangement in which a priority is set to each of a plurality of cameras forming a camera system 110, and each foreground image to be provided is selected in accordance with the capacity limit when the data is provided for the virtual viewpoint image generation processing. The arrangement of an image processing system 100 according to the fourth embodiment is the same as that of the third embodiment (FIG. 5). FIG. 7 is a flowchart illustrating visibility data determination processing, according to the fourth embodiment, in which the foreground image is set as the selection target. Note that in FIG. 7, processing steps that have the same functions as those of the third embodiment (FIG. 6) are denoted by the same step numbers.

In step S600, a visibility data determination unit 160b obtains, from a storage device 150b, a three-dimensional model and its visibility data of a frame time to be processed. In step S601, the visibility data determination unit 160b sets all cameras 81a to 81h of the camera system 110 as the selection candidates. In step S602, the visibility data determination unit 160b sets the priority value to the maximum value that can be selected. For example, the total number of cameras of the camera system 110 is set as the priority. In the example of FIG. 8, 8 is set as the priority value.

In step S701, as a condition to end the visibility data determination processing, the visibility data determination unit 160b sets, as a valid priority value, the lowest priority value to execute the processing. It may be arranged so that the valid priority value is set by a control unit 210. The set valid priority value is input to the visibility data determination unit 160b. However, the present invention is not limited to this, and it may be arranged so that the valid priority value will be determined automatically from the data capacity or the like when the data is to be output to a storage device 150a as in the second embodiment. Assume that the valid priority value will be temporarily set to 6 in this embodiment.

In step S702, the visibility data determination unit 160b determines whether to end the visibility data determination processing. In this case, the visibility data determination unit 160b determines whether the priority value to be set to the camera has become smaller than the valid priority value, and determines to end the processing when the priority value is smaller than the valid priority value. If the visibility data determination unit determines to end the processing, the process advances to step S703. Otherwise, the process advances to step S604.

The visibility data determination unit 160b calculates a first contribution (the bottom row of the table shown in FIG. 9) of each camera, and selects, from the selection candidate cameras, each camera with the highest first contribution value (steps S604 and S103). In step S704, a priority order addition unit 510 adds, to the selected camera 81c, 8 as the current priority value. In step S606, the priority order addition unit 510 decrements the priority value by 1. In this case, the priority value is changed to 7.

Subsequently, the visibility data determination unit 160b removes (step S105) the selected camera 81c from the selection candidates, and removes (step S607) points observable from the selected camera 81c from the selection candidates. As a result, the selection candidate flag of the camera 81c and the selection candidate flags of points 802 to 806 shown in FIG. 9 are changed to "0". The process returns to step S702, and the visibility data determination unit 160b determines whether to end the visibility data determination processing. Since 7 which is set as the priority value is equal to or more than 6 which is the valid priority value, the visibility data determination unit does not end the processing and causes the process to advance again to step S604.

The visibility data determination unit 160b calculates the first contribution of each camera remaining as the selection candidate by using the points remaining as the selection candidates (step S607). As a result, values indicated in the bottom row of the table shown in FIG. 11 are obtained as the first contribution values. The visibility data determination unit 160b selects, from the selection candidate cameras, a camera (the camera 81g shown in FIG. 9 in this case) with the highest first contribution value (step S103). The priority order addition unit 510 adds (step S704) 7 as the priority value to the selected camera 81g and decrements the priority value by 1. As a result, the priority value is changed to 6. The visibility data determination unit 160b removes (step S105) the selected camera 81g from the selection candidates, and removes (step S607) from the selection candidate points each point observable from the selected camera 81g. As a result, the selection candidate flag of the camera 81g and the selection candidate flags of points 807 to 810 shown in FIG. 9 are changed to "0". The process returns to step S702, and the visibility data determination unit 160b determines whether to end the visibility data determination processing. Since 6 which is set as the priority value is equal to or more than 6 which is the valid priority value, the visibility data determination unit does not end the processing and causes the process to advance again to step S604.

The visibility data determination unit 160b calculates the first contribution of each camera remaining as the selection candidate by using the points remaining as the selection candidates (step S607). As a result, values indicated in the bottom row of the table shown in FIG. 12 are obtained as the first contribution values. The visibility data determination unit 160b selects, from the selection candidate cameras, a camera (the camera 81a shown in FIG. 9 in this case) with the highest first contribution value (step S103). The priority order addition unit 510 adds (step S704) 6 as the priority value to the selected camera 81a and decrements the priority value by 1. As a result, the priority value is changed to 5. The visibility data determination unit 160b removes (step S105) the selected camera 81a from the selection candidates, and removes (step S607) from the selection candidate points each point observable from the selected camera 81a. As a result, the selection candidate flag of the camera 81a and the selection candidate flag of a point 801 shown in FIG. 9 are changed to "0".

The process returns to step S702 to determine whether to end the visibility data determination processing. Since 5 which is set as the priority value is smaller than 6 which is the valid priority value, the process advances to step S703. In step S703, the priority order addition unit 510 sets 5 as the priority value of each camera without a priority. FIG. 15 shows the result of the visibility data determination processing. The priority values of 5 to 8 have been added to the cameras 81a to 81h. The priority order addition unit 510 causes this result to be recorded in the storage device 150b.

In a case in which a user terminal 200 is to perform virtual viewpoint image generation, a control unit 210 sets, in the same manner as in the first embodiment, a frame time from which the virtual viewpoint image is to be generated. In a virtual viewpoint image generation unit 220, first, a three-dimensional model and the visibility data are read out from the storage device 150b via an output unit 170c. A line determination unit 190a grasps the line status of a line 180 and determines the priority order of the data is to be transmitted. More specifically, first, the line determination unit 190a subtracts, from the line capacity of the line 180, the data amount of the transmitted three-dimensional model and the visibility data. The line determination unit 190a calculates, from the remaining capacity, the transmission capacity of the foreground image data, and determines, based on this calculation, the priority value for transmitting the foreground image data that matches the transmissible capacity. Assume that the foreground images obtained from cameras with priority values up to 6 are transmitted in this case. As a result, the output unit 170c outputs the foreground images of the cameras 81a, 81c, and 81g to the virtual viewpoint image generation unit 220. The virtual viewpoint image generation unit 220 generates a virtual viewpoint image corresponding to the position and the direction of the virtual viewpoint designated from a virtual camera operation unit 230.

Based on the arrangements and the operations described above, it is possible to transmit required data, in relation to the generation of a virtual viewpoint image, while suppressing the capacity of transmission by selecting an appropriate background image with respect to a limit such as the capacity of transmission. It becomes possible to adaptively transmit the required data by changing the value of the priority of the transmission depending on the situation in a case in which the capacity of transmission is variable. In addition, since required information can be transmitted regardless of the virtual viewpoint, it is possible to generate another virtual viewpoint image by changing the virtual viewpoint by using the transmitted data.

Note that although the completion condition of the visibility data determination processing was determined by comparing the valid priority value and the priority value in the fourth embodiment, the present invention is not limited to this. For example, the process may be continued as long as there are remaining selection candidate cameras, and the visibility data determination processing may be ended when there are no selection candidate cameras. In addition, although a priority was set to every point of a three-dimensional model in the third embodiment, it may be set so that the priority setting processing will be discontinued by setting a valid priority in the manner according to the fourth embodiment.

According to the above-described embodiment, it is possible to easily generate a virtual viewpoint image regardless of the scale of the apparatuses forming a system such as the number of cameras of the camera system 110, the output frame rate and the output resolution of each captured image, and the like.

According to the image processing systems of the above-described embodiments, in relation to the generation of a virtual viewpoint image, appropriate data corresponding to various kinds of limits such as a limit of the capacity of transmission, the storage capacity, and the like is selected. As a result, it becomes possible to transmit and store required data for the generation of the virtual viewpoint image while reducing an influence due to the various kinds of limits such as the limit of the capacity of transmission, the storage capacity, and the like. In addition, since the information required for the generation of the virtual viewpoint image can be transmitted without depending on the virtual viewpoint, it is possible to generate a virtual viewpoint image of a different virtual viewpoint from the transmitted data. Furthermore, since the information required for the generation of the virtual viewpoint image can be transmitted before the setting of the virtual viewpoint, it becomes possible to reduce delays that occur in the generation of the virtual viewpoint image. Although the embodiments of the present invention have been described in detail above, the present invention is not limited to the above-described embodiments, and various modifications and changes can be made within the spirit and scope of the present invention described in the appended claims. For example, some or all of the processing operations of the above-described embodiments may be arbitrarily combined.

Note that in each of the embodiments described above, it is assumed that the information processing apparatus 10 will output, to the user terminal 200 that is to generate the virtual viewpoint image, material data which are selected, from the material data stored in the storage device 150, based on the visibility data. However, the present invention is not limited to this, and the information processing apparatus 10 may generate a virtual viewpoint image based on the material data which are selected, from the material data stored in the storage device 150, based on the visibility data and the viewpoint information indicating the position and the direction of the virtual viewpoint. In addition, the storage device 150 may be included in the information processing apparatus 10 or may be included in another apparatus which is to be connected to the information processing apparatus.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-018517, filed Feb. 5, 2018, which is hereby incorporated by reference herein in its entirety.

What is claimed is:

1. An information processing apparatus comprising:
one or more memories storing instructions; and
one or more processors executing the instructions to:
obtain visibility information for specifying which imaging apparatus captures a region corresponding to an element forming a three-dimensional shape model generated based on a plurality of captured images captured by a plurality of imaging apparatuses;
select, based on the obtained visibility information, from material data which is based on captured image obtained by the plurality of imaging apparatuses, data to be used to generate a virtual viewpoint image; and
output the selected data to an apparatus generating the virtual viewpoint image based on the selected data.

2. The apparatus according to claim 1, wherein the material data includes at least one of partial image data extracted from the captured image and the three-dimensional shape model.

3. The apparatus according to claim 1, wherein the one or more processors further execute the instructions to determine, based on the obtained visibility information, a priority of the material data,
wherein the data to be used for the generation of the virtual viewpoint image is selected based on the determined priority.

4. The apparatus according to claim 3, wherein the priority is determined based on the number of the elements of the three-dimensional shape model, which correspond to regions captured by an imaging apparatus.

5. The apparatus according to claim 4, wherein the larger the number of the elements of the three-dimensional shape model is, the higher the priority is.

6. The apparatus according to claim 3, wherein the priority is determined, based on the number of imaging apparatuses capturing a region corresponding to an element of the three-dimensional shape model.

7. The apparatus according to claim 6, wherein the smaller the number of the imaging apparatuses is, the higher the priority is.

8. The apparatus according to claim 1, wherein the data to be used for the generation of the virtual viewpoint image is selected so a total amount of the data to be used for the generation of the virtual viewpoint image will not exceed a predetermined data capacity.

9. The apparatus according to claim 8, wherein the predetermined data capacity is a data capacity related to a storage capacity or a line included in a system for generating the virtual viewpoint image.

10. The apparatus according to claim 1, wherein the element of the three-dimensional shape model is one of points in a case where the three-dimensional shape model is formed by a point cloud and mash in a case where the three-dimensional shape model is formed by a set of meshes.

11. The apparatus according to claim 1, wherein the material data is stored in an apparatus to be connected to the information processing apparatus.

12. A method of controlling an information processing apparatus that performs processing to generate a virtual viewpoint image based on a plurality of captured images obtained by performing image capturing from a plurality of directions by a plurality of cameras, the method comprising:
    obtaining visibility information for specifying which imaging apparatus captures a region corresponding to an element forming a three-dimensional shape model generated base on a plurality of captured images captured by a plurality of imaging apparatuses;
    selecting, based on the obtained visibility information, from material data which is based on captured image obtained by the plurality of imaging apparatuses, data to be used to generate a virtual viewpoint image; and
    output the selected data to an apparatus generating the virtual viewpoint image based on the selected data.

13. The method according to claim 12, wherein the material data includes at least one of partial image data extracted from the captured image and the three-dimensional shape model.

14. The method according to claim 12, further comprising:
    determining, based on the obtained visibility information, a priority of the material data,
    wherein the data to be used for the generation of the virtual viewpoint image is selected based on the determined priority.

15. A non-transitory computer-readable storage medium that stores a program configured to cause a computer to execute a method of controlling an information processing apparatus that performs processing to generate a virtual viewpoint image based on a plurality of captured images obtained by performing image capturing from a plurality of directions by a plurality of cameras, the method comprising:
    obtaining visibility information for specifying which imaging apparatus captures a region corresponding to an element forming a three-dimensional shape model generated base on a plurality of captured images captured by a plurality of imaging apparatuses;
    selecting, based on the obtained visibility information, from material data which is based on captured image obtained by the plurality of imaging apparatuses, data to be used to generate a virtual viewpoint image; and
    output the selected data to an apparatus generating the virtual viewpoint image based on the selected data.

* * * * *